Figures 1, 2:
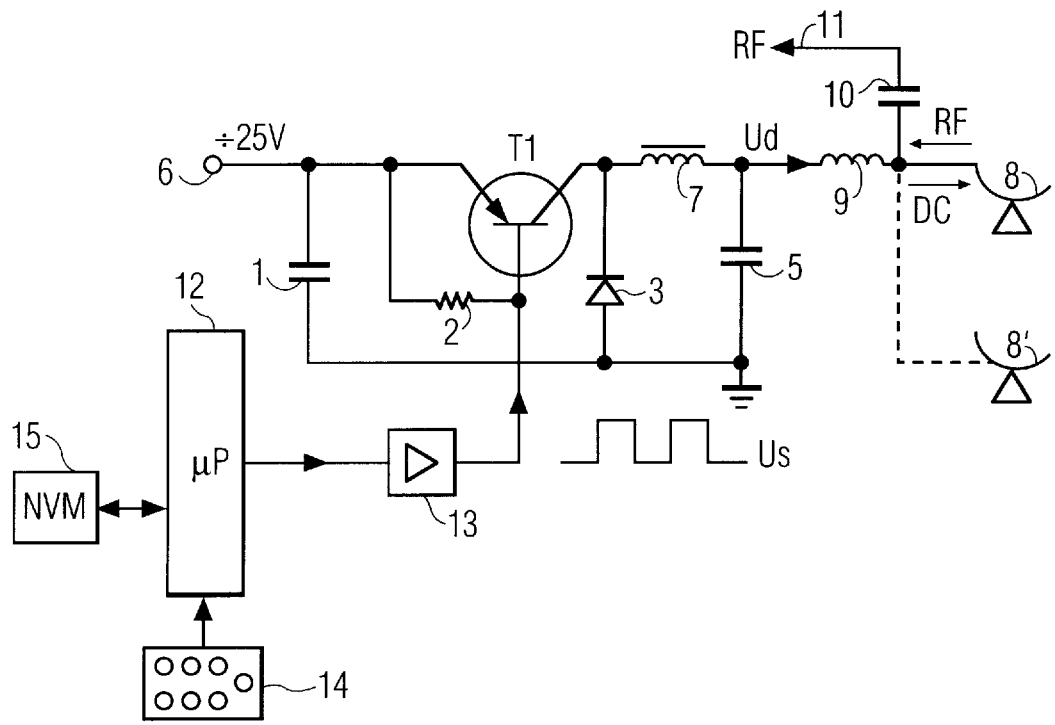

United States Patent [19]
Vizer

[11] Patent Number: 5,893,023
[45] Date of Patent: *Apr. 6, 1999

[54] SATELLITE RECEIVER INCLUDING OPERATING VOLTAGE SUPPLY ARRANGEMENT SUITABLE FOR DIFFERENT ANTENNA ASSEMBLIES

[75] Inventor: David Michael Vizer, Enfield, Great Britain

[73] Assignee: Ferguson Limited, Endfield, Great Britain

[*] Notice: This patent issued on a continued prosecution application filed under 37 CFR 1.53(d), and is subject to the twenty year patent term provisions of 35 U.S.C. 154(a)(2).

[21] Appl. No.: 582,403

[22] Filed: Jan. 3, 1996

Related U.S. Application Data

[63] Continuation of Ser. No. 341,397, Oct. 4, 1994, abandoned, which is a continuation of Ser. No. 974,011, filed as PCT/EP00708, Apr. 13, 1991, abandoned.

[30] Foreign Application Priority Data

Apr. 20, 1990 [GB] United Kingdom ............... 9008898

[51] Int. Cl.$^6$ ....................................................... H04B 1/18
[52] U.S. Cl. ........................ 455/3.2; 455/270; 455/277.1; 455/291
[58] Field of Search ................. 455/3.2, 6.1, 19, 455/272, 277.1, 278.1, 289, 280, 343, 269, 270, 282, 290, 291; 363/56; 323/283, 284; 330/297, 202

[56] References Cited

U.S. PATENT DOCUMENTS

| | | | |
|---|---|---|---|
| 4,396,986 | 8/1983 | Salesky | 364/483 |
| 4,509,198 | 4/1985 | Nagatomi | 455/4 |
| 4,592,093 | 5/1986 | Ouchi et al. | 455/4 |
| 4,593,409 | 6/1986 | Miller | 455/343 |
| 4,800,477 | 1/1989 | Esposito | 363/56 |
| 5,301,352 | 4/1994 | Nakagawa et al. | 455/3.2 |
| 5,331,354 | 7/1994 | Koyama et al. | 455/3.2 |
| 5,345,591 | 9/1994 | Tsurumaki et al. | 455/3.2 |

FOREIGN PATENT DOCUMENTS

| | | | |
|---|---|---|---|
| 0149533 | 7/1985 | European Pat. Off. | H03D 7/16 |
| 0 196 607 | 10/1986 | European Pat. Off. | H04N 5/44 |
| 32 20 267 | 5/1981 | Germany | H02P 13/32 |
| 3825485A | 11/1990 | Germany | H04N 5/63 |

OTHER PUBLICATIONS

World Satellite TV and Scrambling Methods, F. Baylin, R. Maddox & J. McCormac Second Edition, Sep. 1991.
Home Satellite TV Installation and Troubleshooting Manual, Baylin, Gale, Long –Third Edition Jan. 1991.
ALBA/BUSH–SAT 500/SR 5000 (Schematic) Nov. 1989 –3 pgs.
Das Grobe Werkbuch Electronik –(w/translation) Franzis' 4 pgs. 1989.
Jahresagung der FKTG (w/translation) 24 Mai 1984) 5 pgs.

*Primary Examiner*—Reinhard J. Eisenzopf
*Assistant Examiner*—Philip J. Sobutka
*Attorney, Agent, or Firm*—Joseph S. Tripoli; Peter M. Emanuel; Kuniyuki Akiyama

[57] ABSTRACT

A satellite receiver which is capable of being connected to different antenna assemblies which require different operating voltages, includes a switch mode power supply which supplies the different operating voltages. A microprocessor controls the duty cycle of the switch mode power supply to produce the different operating voltages in accordance with the required duty cycle. A memory stores values which define different duty cycles for each of the operating voltages and provides the values to the microprocessor.

7 Claims, 1 Drawing Sheet

| A) PROGRAM NR. | 1 | 2 | 3 | 4 |
|---|---|---|---|---|
| B) CHANNEL FREQUENCY | 11 GHz | 12 GHz | 13 GHz | 14 GHz |
| C) Us | ___ | ⊓⊔ | ⊓⊔ | ─── |
| D) DUTY CYCLE | 0 | 50% | 65% | 100% |
| E) Ud | 25V | 12V | 7V | 0V |
| F) POLARIZATION OF DISH | HORIZ. | VERTIC. | VERTIC. | HORIZ. |

SATELLITE RECEIVER INCLUDING OPERATING VOLTAGE SUPPLY ARRANGEMENT SUITABLE FOR DIFFERENT ANTENNA ASSEMBLIES

This is a continuation of application Ser. No. 08/341,397, filed Oct. 4, 1994, now abandoned, which is a continuation of application Ser. No. 07/974,011, filed Nov. 9, 1992, now abandoned.

This is a continuation of PCT application PCT/EP 91/00708 filed Apr. 13, 1991 by David Michael Vizer and titled "Receiver For Satellite Reception".

The present invention relates to receivers for reception of microwave signals, for instance transmissions from earth satellites, via different antenna assemblies requiring different operation voltages for LNC (Low Noise Converter) units and/or polarization switching the receiver being controlled by a microprocessor and including a switch mode power supply unit furnishing said voltages.

For microwave reception a large number of different antenna assemblies are available. Said antenna assemblies need different operating voltages for feeding LNC (Low Noise Converter) at the antenna assembly and for initiating a switching operation between polarizations and/or different frequency bands. Said operating voltages are generated within the receiver and fed to the antenna assembly via its cable or a separate cable. Due to the great number of different voltages required by different antenna assemblies in many cases the receiver cannot operate together with an antenna assembly because the receiver cannot make available the operation voltage required. Otherwise additional means are necessary for making available the operating voltage for the antenna assembly connected to the receiver.

It is, therefore, an object of the invention to modify the receiver in such a way that various antenna assemblies needing different operating voltages from various manufacturers can be used in combination with the receiver.

According to the invention means are provided for storing individually for one channel, values within a memory associated with or part of a microprocessor said values defining the duty cycle of switching operation of a switch mode power supply unit.

The storing of said values may be effected via a remote control unit. The values may be stored within a memory associated with the microprocessor.

Preferably when programming the receiver for different channels additionally a value is given manually and stored in a memory said value defining the duty cycle of a voltage delivered by the microprocessor for each channel. Said voltage is used for controlling the operation of the switch mode power supply generating an operating voltage of the desired value. The use of a switch mode power supply enables a full range of operating voltages for example from 0 V to 25 V. A switched mode power supply has been chosen to minimize thermal dissipation within the receiver. By varying values for the duty cycle a very large number of different operating voltages can be realized. When selecting a specific program or a specific channel and tuning the receiver to said channel, the corresponding correct operating voltage for the antenna assembly is made available automatically by the switch mode power supply. Therefore to additionally select the operating voltage for the antenna assembly. This means that there is always an association between the program selected and the DC voltage which is produced by the switch mode power supply and which is fed to the antenna assembly.

In order that the invention may more readily be understood, a description is now given by way of example only, reference being made to the drawing. Within the drawing FIG. 1 shows a simplified circuit for generating the operating voltages for an antenna assembly and FIG. 2 shows diagrams for explaining the function of the circuit according to FIG. 1.

FIG. 1 shows the switch mode power supply including a switching transistor T1, a capacitor 1, a resistor 2, diode 3, inductor 4 and a capacitor 5. Input 6 of the switch mode power supply is connected to a DC voltage. At output 7 a DC operating voltage Ud is produced which is fed to antenna assembly 8 via a cable including an inductor 9 for radio frequency isolation. Operating voltage Ud is fed to antenna assembly 8 for feeding the LNC of the antenna assembly and for switching the antenna assembly between polarizations and/or frequency bands. The received RF signal is fed via capacitor 10 and line 11 to the antenna input of the receiver. A different antenna assembly 8' can alternatively be connected to the receiver as indicated by the connection shown in phantom.

Amplitude of DC voltage Ud is controlled by switching voltage Us fed from microprocessor 12 via driver circuit 13 to the base of transistor Ti. When programming the receiver, additionally different values for different duty cycles of switching voltage Us are stored within a memory associated with microprocessor 12. When tuning the receiver to a specific program or channel the duty cycle of switching voltage Us and thereby the value of operating voltage Ud is varied in such a way that the antenna assembly 8 receives the appropriate operating voltage needed for LNC or for switching operation. Said means within antenna assembly 8 are well known per se.

FIG. 2 shows the relationship by way of example between the different values. According to line a in FIG. 2 the receiver may be tuned to programs number 1, 2, 3, 4 corresponding to the frequencies of received channels indicated in line b. Line c shows switching voltage Us with different duty cycles. With program number 1 Us remains low so that transistor T1 remains in on condition so that Ud is approximately 25 V. With program number 2 duty cycle is 50% so that transistor T1 is in on condition and cut-off condition for the same time and Ud becomes about 12 V. In the same ay for program number 3 duty cycle is increased to 65% so that T1 is in "on" condition for a shorter time and Ud goes down to approximately 7 V. With program number 4 Us remains high, transistor T1 remains cut-off so that Ud becomes 0 V.

As can be seen from FIG. 2 a very large number of operating voltages Ud can be achieved by storing corresponding values for various duty cycles and values of Ud within memory Said memory being non-volatile. The storing of said values may be effected via a remote control unit 14.

I claim:

1. In a satellite receiver, apparatus comprising:

RF input means for receiving RF signals from an antenna assembly;

means for coupling a DC operating voltage to said antenna assembly via said RF input means for receiving said RF signals;

a switch mode power supply for supplying said DC operating voltage in response to a control voltage;

said switch mode power supply operating as a DC to DC converter and comprising a switching transistor and a low-pass filter, said switching transistor having two current conducting electrodes and a control electrode, one of said current conducting electrodes being connected to a source of DC input voltage and the other of current conducting electrodes being connected to said low-pass filter, said low-pass filter being connected in series following said switching transistor;

means for controlling a duty cycle of said control voltage, said control voltage applied to said control electrode of said switching transistor for controlling the magnitude of said DC operating voltage;

said duty-cycle controlling means including a memory for storing a plurality of digital data representing a respective plurality of different duty cycles of said control voltage which correspond to respective ones of a plurality of said different DC operating voltages; and a circuit including a microprocessor which generates said control voltage for controlling said duty cycle in response to said digital data stored in said memory.

2. The apparatus recited in claim 1 wherein:

said apparatus is capable of tuning RF signals received from one of a plurality of different antenna assemblies which have different DC operating voltage requirements.

3. The apparatus recited in claim 1, wherein:

said low pass filter comprises an inductor and a capacitor, connected between an output point of said switching transistor and a ground potential, the DC operating voltage being developed at the junction of said inductor and said capacitor.

4. The apparatus recited in claim 1, wherein:

a remote control unit is provided for controlling said digital data stored in said memory.

5. The apparatus recited in claim 1, wherein:

a driver is coupled between said microprocessor and said control electrode of said switching transistor to generate said control voltage.

6. The apparatus recited in claim 5, wherein:

said microprocessor changes the duty cycle of said control voltage on a channel basis.

7. In a satellite receiver, apparatus comprising:

RF input means for receiving RF signals from one of a plurality of antenna assemblies requiring different DC operating voltage;

means for coupling a DC operating voltage to said one of said plurality of antenna assemblies via said RF input means for receiving said RF signals;

a switch mode power supply for supplying said DC operating voltage in response to a control voltage;

said switch mode power supply operating as a DC to DC converter and comprising a switching transistor and a low-pass filter, said switching transistor having two current conducting electrodes and a control electrode, one of said current conducting electrodes being connected to a source of DC input voltage and the other of current conducting electrodes being connected to said low-pass filter, said low-pass filter being connected in series following said switching transistor;

means for controlling a duty cycle of said control voltage, said control voltage applied to said control electrode of said switching transistor for controlling the magnitude of said DC operating voltage;

said duty-cycle controlling means including a memory for storing a plurality of digital data representing a respective plurality of different duty cycles of said control voltage which correspond to respective ones of a plurality of said different DC operating voltages; and a circuit including a microprocessor which generates said control voltage for controlling said duty cycle in response to said digital data stored in said memory.

* * * * *